US012442386B1

(12) United States Patent
Wu et al.

(10) Patent No.: US 12,442,386 B1
(45) Date of Patent: Oct. 14, 2025

(54) CENTRIFUGAL FAN BLADE AND FLUID HEAT EXCHANGE DEVICE

(71) Applicant: SHENZHEN STONEPLUS THERMAL MANAGEMENT TECHNOLOGIES LIMITED, Shenzhen (CN)

(72) Inventors: Hsiu-Wei Wu, Shenzhen (CN); En-Yu Lin, Shenzhen (CN); Zhongqi Zhou, Shenzhen (CN)

(73) Assignee: SHENZHEN STONEPLUS THERMAL MANAGEMENT TECHNOLOGIES LIMITED, Shenzhen (CN)

( * ) Notice: Subject to any disclaimer, the term of this patent is extended or adjusted under 35 U.S.C. 154(b) by 0 days.

(21) Appl. No.: 18/671,869

(22) Filed: May 22, 2024

Related U.S. Application Data

(63) Continuation of application No. PCT/CN2024/089359, filed on Apr. 23, 2024.

(30) Foreign Application Priority Data

Apr. 11, 2024 (CN) ......................... 202410433878.8

(51) Int. Cl.
*F04D 29/28* (2006.01)
*F04D 29/30* (2006.01)

(52) U.S. Cl.
CPC ............ *F04D 29/281* (2013.01); *F04D 29/30* (2013.01); *F05D 2240/304* (2013.01)

(58) Field of Classification Search
CPC ... F04D 29/281; F04D 29/30; F05D 2240/304
See application file for complete search history.

(56) References Cited

U.S. PATENT DOCUMENTS 1,041,913 A * 10/1912 Tyson ..................... B64C 11/18 416/237
3,006,534 A * 10/1961 Mcdonald ............. F04D 29/282 416/186 A (Continued)

FOREIGN PATENT DOCUMENTS

CN 101363449 A 2/2009
CN 205298058 U 6/2016

(Continued)

OTHER PUBLICATIONS

Fukumoto JP56000597A_MT—English Machine Translation (Year: 1981).*

(Continued)

*Primary Examiner* — Nathaniel E Wiehe
*Assistant Examiner* — Ayne A Lambert
(74) *Attorney, Agent, or Firm* — Westbridge IP LLC

(57) ABSTRACT

Disclosed are a centrifugal fan blade and a fluid heat exchange device. The centrifugal fan blade includes a hub and a plurality of blades. The plurality of blades are provided at intervals along a periphery of the hub. The plurality of blades include a body part and a bending part. One end of the body part is connected to the hub, and the bending part is provided at an end of the body part away from the hub. An orientation and a rotation direction of the bending part are the same, and an angle is formed between the bending part and the body part.

18 Claims, 4 Drawing Sheets

(56) References Cited

U.S. PATENT DOCUMENTS

| | | | | | |
|---|---|---|---|---|---|
| 3,119,553 | A * | 1/1964 | Millman | F04D 29/281 D23/413 |
| 5,525,269 | A * | 6/1996 | Connolly | B01F 23/23341 366/264 |
| 6,352,408 | B1 * | 3/2002 | Kilian | B63H 1/26 416/235 |
| 6,994,523 | B2 * | 2/2006 | Eguchi | F04D 29/384 416/235 |
| D563,544 | S * | 3/2008 | Hwang | D23/413 |
| 9,611,860 | B2 * | 4/2017 | Son | F04D 29/30 |
| 10,781,822 | B2 * | 9/2020 | Chan | F04D 29/30 |
| 2007/0116576 | A1 * | 5/2007 | Chang | F04D 29/281 416/228 |
| 2009/0035126 | A1 * | 2/2009 | Hwang | F04D 29/281 415/119 |
| 2009/0041585 | A1 * | 2/2009 | Hwang | F04D 25/0613 416/243 |
| 2009/0053052 | A1 * | 2/2009 | Hwang | F04D 29/281 415/203 |
| 2009/0060730 | A1 * | 3/2009 | Hwang | F04D 29/30 415/203 |
| 2009/0169389 | A1 * | 7/2009 | Hwang | F04D 29/30 416/210 R |
| 2011/0123348 | A1 * | 5/2011 | Greenblatt | B64C 11/18 416/241 R |
| 2012/0224951 | A1 * | 9/2012 | Degner | F04D 29/30 29/888.025 |

FOREIGN PATENT DOCUMENTS

| | | | | |
|---|---|---|---|---|
| CN | 208169196 U | | 11/2018 | |
| CN | 215214091 U | | 12/2021 | |
| CN | 115126719 A | | 9/2022 | |
| CN | 220705977 U | | 4/2024 | |
| FR | 2702521 A3 | * | 9/1994 | F04D 29/662 |
| JP | 56000597 A | * | 1/1981 | |
| JP | H0587093 A | * | 4/1993 | |
| JP | 2001082383 A | | 3/2001 | |
| JP | 2007138824 A | | 6/2007 | |
| TW | M516102 U | | 1/2016 | |

OTHER PUBLICATIONS

Hasegawa JP2001082383A_MT—English Machine Translation (Year: 2001).*

First Office Action issued in counterpart Chinese Patent Application No. 202410433878.8, dated Jul. 27, 2024.

International Search Report and Written Opinion issued in corresponding PCT Application No. PCT/CN2024/089359, dated Jul. 6, 2024.

First Office Action issued in counterpart Taiwanese Patent Application No. 113117210, dated Dec. 3, 2024.

* cited by examiner

CENTRIFUGAL FAN BLADE AND FLUID HEAT EXCHANGE DEVICE

CROSS-REFERENCE TO RELATED APPLICATIONS

The present application is a continuation application of International Application No. PCT/CN2024/089359, filed on Apr. 23, 2024, which claims priority to Chinese Patent Application No. 202410433878.8, filed on Apr. 11, 2024. The disclosures of the above-mentioned applications are incorporated herein by reference in their entireties.

TECHNICAL FIELD

The present application relates to the technical field of fluid heat exchange device, and in particular to a centrifugal fan blade and a fluid heat exchange device.

BACKGROUND

With the development of technology, the functionality of various electronic devices has become increasingly powerful, which in turn places higher demands on the heat exchange capabilities of electronic devices to enhance the stability of their operation.

The centrifugal heat exchange device is designed to drive the flow of fluid around its fan blades by rotating the blades, thereby exchanging heat with the electronic devices. This helps to lower or increase the operating environment temperature of the electronic devices, allowing them to operate within a comfortable temperature range.

However, fan blades in the related art are usually designed with plastic materials. In order to consider the stability of molding quality, they are generally designed with uniform thickness and gradient design until the molding end of the product is the thinnest part of the product. The design of centrifugal fans basically needs to comply with this design principle, so the thickness of the centrifugal fan blades needs to maintain uniformity. Especially for notebook computer applications, it is normal for the fan blades to be designed to have equal thicknesses.

Flow is defined as air velocity multiplied by the area through which it passes. Therefore, the faster the wind speed, the greater the flow through the same area. Usually under the conditions of the same quantity of blades and the same speed, the wind speed performance of the centrifugal fan from between the two blades will have different results depending on the design of the blade outlet angle. When the optimized fan blade design is completed, the wind speed performance is fixed. At this point, the wind speed can be increased only by increasing the rotation speed.

Therefore, there is an urgent need to design a heat exchange device that can quickly increase wind speed and motor efficiency while maintaining constant blade thickness.

SUMMARY

The main objective of the present application is to provide a centrifugal fan blade and a fluid heat exchange device, aiming to improve the heat exchange efficiency of the fluid heat exchange device by optimizing the structure of the centrifugal fan blade.

In order to achieve the above objective, in a first aspect, the present application provides a centrifugal fan blade, which includes a hub and a plurality of blades. The plurality of blades are sequentially provided at intervals along the periphery of the hub, and the blade includes a body part and a bending part, one end of the body part is connected to the hub, and the bending part is provided at an end of the body part away from the hub. An orientation and a rotation direction of the bending part are the same, and an angle is formed between the bending part and the body part.

In an embodiment, the body part includes a first surface and a second surface provided oppositely along a thickness direction; and the bending part is protrudingly provided from the first surface.

In an embodiment, a minimum distance between the first surface and the second surface is t1, and a distance of the bending part protruding from the first surface is t2; t2 is greater than or equal to 0.5t1, and t2 is less than or equal to 2.5t1.

In an embodiment, the bending part includes a third surface and a fourth surface provided oppositely; the third surface is connected to the first surface, and the fourth surface is connected to the second surface; and a minimum distance between the first surface and the second surface is t1, and a distance between the third surface and the fourth surface is t3; t3 is greater than or equal to 0.5t1, and t3 is less than or equal to 1.5t1.

In an embodiment, a distance between the first surface and the second surface along the thickness direction is kept consistent at any position of the body part.

In an embodiment, a rounded angle is provided between the third surface and the first surface.

In an embodiment, a rounded angle is provided between the fourth surface and the second surface.

In an embodiment, the body part is in a curved plate structure, and a distance between adjacent body parts at an end of the body part close to the hub is smaller than a distance between adjacent body parts at an end of the body part away from the hub.

In an embodiment, the plurality of blades are centrally symmetrical about the hub.

In a second aspect, the present application further provides a fluid heat exchange device, including a centrifugal fan blade as provided in any embodiment of the first aspect.

The technical solution of the present application is to provide a centrifugal fan blade including a body part and a bending part. The bending part is provided at an end of the body part away from the hub. The direction of the bending part is consistent with the direction of rotation, and the bending part is connected to the body part. During the working process of the centrifugal fan blades, the hub rotates under the drive of the external motor, which in turn drives the plurality blades to rotate, so that the fluid is introduced from the intersection of the hub and the blades, and radially pushed out toward an end of the blade away from the hub under the action of centrifugal force. At the same time, since the bending part is provided at the end of the body away from the hub, which creates an obstacle to the fluid to generate turbulence, and further forms an air cushion, changing the original flow path of the fluid and generates outward traction, increasing the fluid flow rate, thereby increasing the flow rate of the fluid when flowing out of the blades and the heat exchange efficiency of the centrifugal fan blades.

BRIEF DESCRIPTION OF THE DRAWINGS

In order to more clearly illustrate the technical solutions in the embodiments of the present disclosure or in the related art, drawings used in the embodiments or in the related art will be briefly described below. Obviously, the drawings in the following description are only an embodiment of the present disclosure. It will be apparent to those skilled in the art that other figures can be obtained according to the structures shown in the drawings without creative work.

Figure 1:
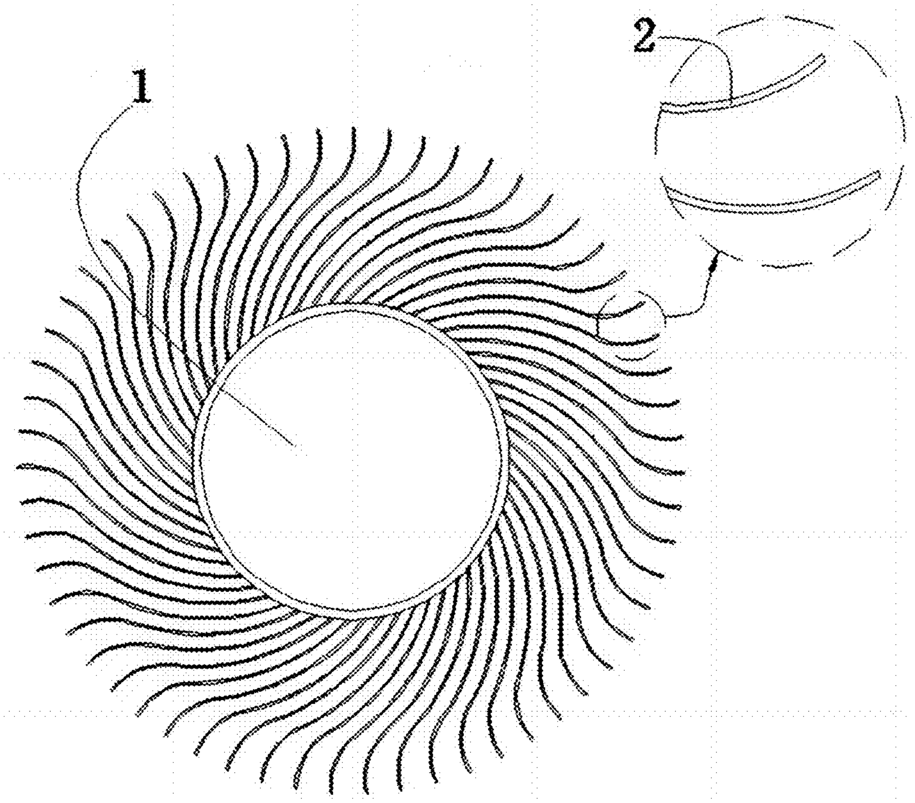
FIG. 1 (Prior Art)
FIG. 1 is a schematic plan diagram of a centrifugal fan blade in the prior art.

The realization of the purpose, functional features and advantages of the present application will be further described with reference to the embodiments and the accompanying drawings.

DETAILED DESCRIPTION OF THE EMBODIMENTS

The technical solutions in the embodiments of the present disclosure will be clearly and completely described below with reference to the drawings in the embodiment of the present disclosure. Obviously, the described embodiments are only a part of the embodiments of the present disclosure, not all of the embodiments. Based on the embodiments in the present disclosure, all other embodiments perceived by those skilled in the art without creative effort should be fallen within the protection scope of the present disclosure.

It should be noted that all of the directional instructions in the embodiments of the present disclosure (such as, up, down, left, right, front, rear . . . ) are only used to explain the relative position relationship and movement of each component under a specific attitude (as shown in the drawings), if the specific attitude changes, the directional instructions will change correspondingly.

Besides, the descriptions in the present disclosure that refer to "first," "second," etc. are only for descriptive purposes and are not to be interpreted as indicating or implying relative importance or to implicitly indicate the number of technical features indicated. Thus, a feature defined as "first" or "second" may explicitly or implicitly include at least one of the features. In addition, technical solutions between the embodiments can be combined with each other, but must be based on the realization of the technical solutions by those skilled in the art, and when the technical solutions are contradictory to each other or cannot be realized, the technical solutions should be considered that the combination does not exist, and the technical solutions are not fallen within the protection scope claimed in the present disclosure.

Figure 2:
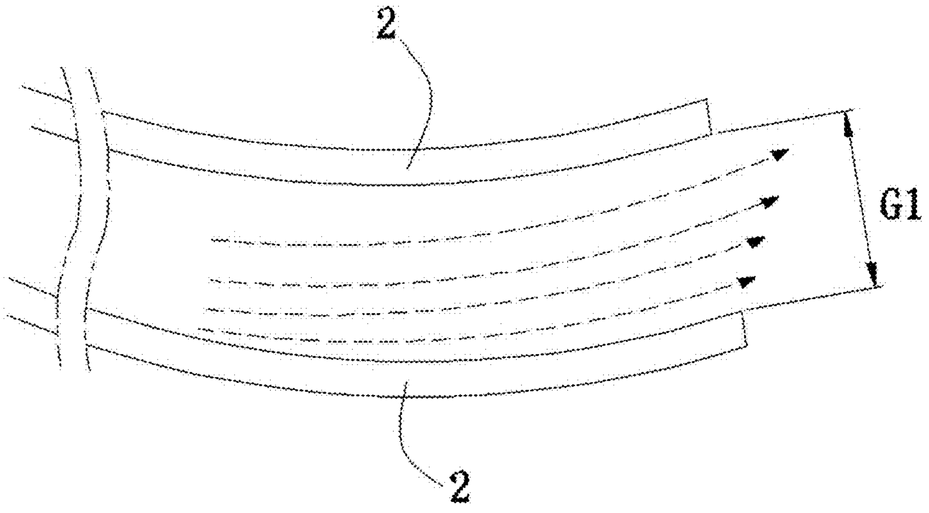
FIG. 2 (Prior Art)
FIG. 2 is a schematic diagram of fluid flow between adjacent blades of the centrifugal fan blade shown in FIG. 1 during operation.

FIG. 1 is a schematic plan diagram of a centrifugal fan blade in the prior art; FIG. 2 is a schematic diagram of fluid flow between adjacent blades of the centrifugal fan blade shown in FIG. 1 during operation.

As shown in FIGS. 1 and 2, the centrifugal fan blades in the prior art usually include a hub 1 and a plurality of blades 2. The plurality of blades 2 are provided at intervals along the periphery of the hub 1 so that when the hub 1 is driven by an external motor, and the plurality of blades 2 can be rotated following the hub 1, so that the fluid around the centrifugal fan blades is introduced from the intersection of the hub 1 and the blades 2, and radially pushed out under the action of centrifugal force. At this time, the fluid leaves approximately parallel to the blades 2.

In this regard, the inventor found in the research that when dealing with how to increase the flow rate of fluid and how to improve the heat exchange efficiency, the centrifugal fan blades with traditional structure are usually limited to increasing the motor speed, so that the centrifugal fan blades can obtain a higher speed, thereby improving the flow rate of the driving fluid; or, increasing the quantity of blades of the fan blades to optimize the heat exchange efficiency. After the inventor made many adjustments to the motor speed, the quantity of blades and other parameters, the optimized fan blade design is completed, and the performance of the wind speed is also fixed. The fluid driving efficiency of centrifugal fan blades with traditional structures tends to be optimized, and it is difficult to further improve the heat exchange efficiency of centrifugal fan blades by adjusting the aforementioned parameters.

In this regard, the present application provides a centrifugal fan blade. The centrifugal fan blade is provided with a bend at the end of the blade away from the hub, and an orientation and a rotation direction of the bend are the same, so as to change the flow direction of the fluid between the fan blades when the centrifugal fan blade rotates and narrow the distance between the blades. Under the condition that the fan blade height and other parameters remain unchanged, the distance between the blades is reduced and the wind speed is also increased. Therefore, using the same motor parameters, the present application can not only change the wind direction, but also increase the wind speed, thereby increasing the fluid flow of the centrifugal fan blades and improving the heat exchange efficiency of the centrifugal fan blades.

Figure 3:
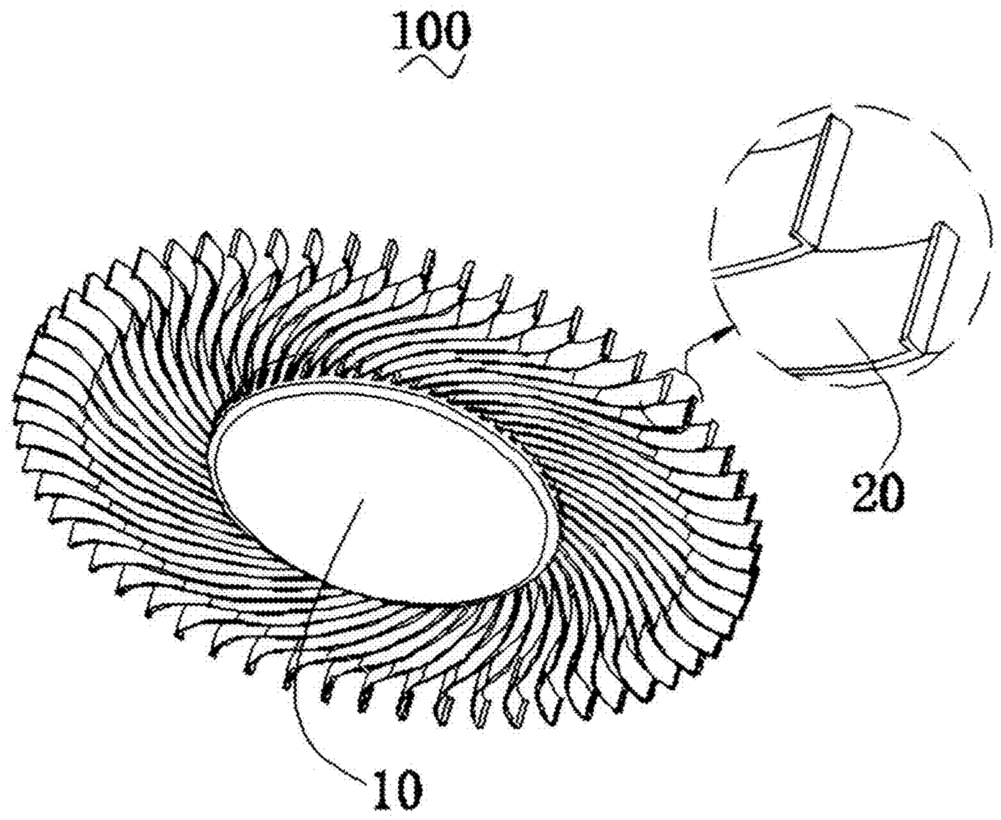
FIG. 3 is a schematic three-dimensional structural diagram of the centrifugal fan blade provided according to a first embodiment of the present application.
Figure 4:
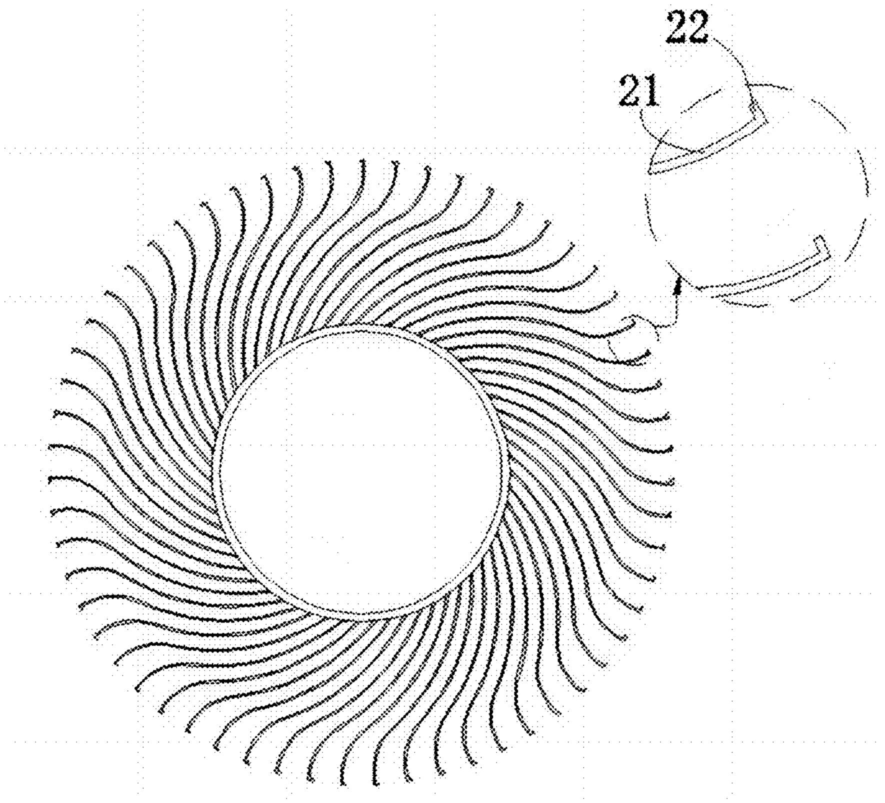
FIG. 4 is a schematic plan diagram of the centrifugal fan blade provided according to the first embodiment of the present application.
Figure 5:
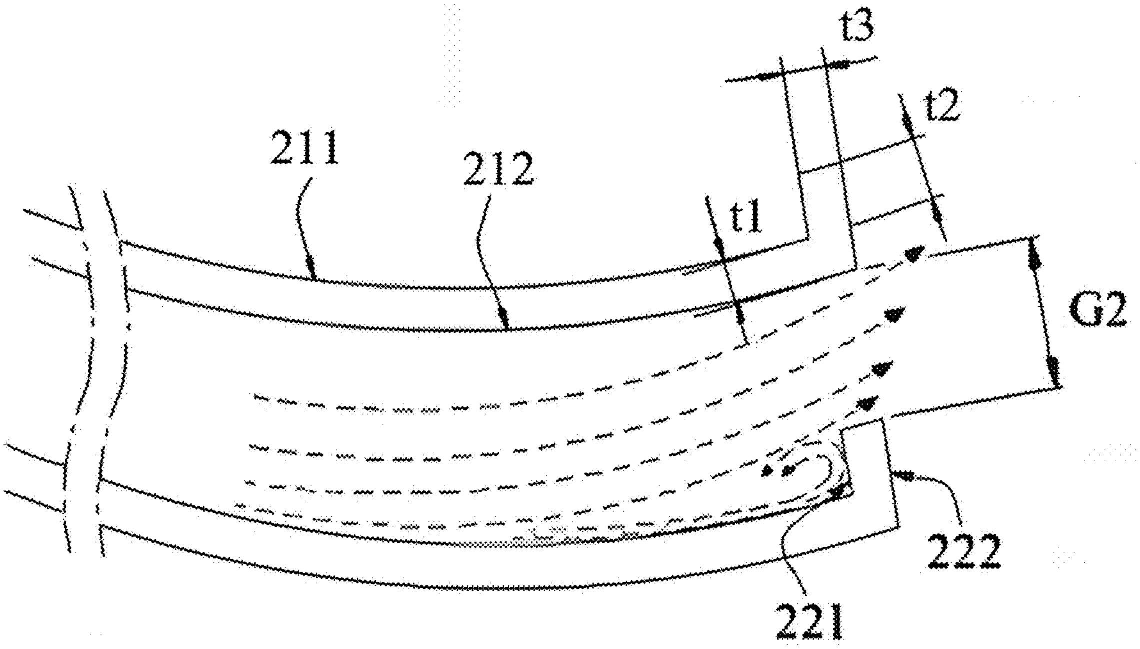
FIG. 5 is a schematic diagram of the fluid flow between the adjacent blades during operation of the centrifugal fan provided according to the first embodiment of the present application.
Figure 6:
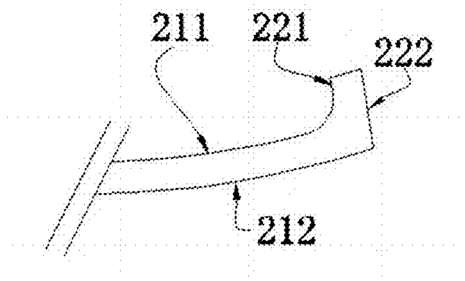
FIG. 6 is a partial structural schematic diagram of the centrifugal fan blade provided according to another embodiment of a first aspect of the present application.
Figure 7:
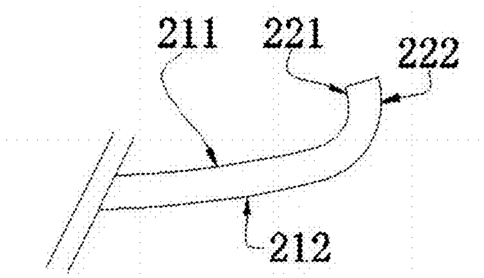
FIG. 7 is a partial structural schematic diagram of the centrifugal fan blade provided according to another embodiment of the first aspect of the present application.

FIG. 3 is a schematic three-dimensional structural diagram of the centrifugal fan blade provided according to a first embodiment of the present application; FIG. 4 is a schematic plan diagram of the centrifugal fan blade provided according to the first embodiment of the present application; FIG. 5 is a schematic diagram of the fluid flow between the adjacent blades during operation of the centrifugal fan provided according to the first embodiment of the present application; FIG. 6 is a partial structural schematic diagram of the centrifugal fan blade provided according to another embodiment of a first aspect of the present application; FIG. 7 is a partial structural schematic diagram of the centrifugal fan blade provided according to another embodiment of the first aspect of the present application.

As shown in FIGS. 3 to 7, the present application provides a centrifugal fan blade 100. The centrifugal fan blade 100 includes a hub 10 and a plurality of blades 20, and the plurality of blades 20 are provided at intervals along the periphery of the hub 10. The blade 20 includes a body part 21 and a bending part 22. One end of the body part 21 is connected to the hub 10. The bending part 22 is provided at an end of the body part 21 away from the hub 10. An orientation and a rotation direction of the bending part 22 are the same, and an angle is formed between the bending part 22 and the body part 21.

The centrifugal fan blade 100 is a component configured to drive fluid movement, and can be rotated under the driving action of an external driving component (such as a motor), thereby driving the fluid movement around the centrifugal fan blade 100. In an embodiment, the centrifugal fan blade 100 can be configured to drive gas flow. In this case, the assembly composed of the centrifugal fan blade and the driving component can be a centrifugal fan. In an embodiment, the centrifugal fan blade 100 can also be configured to drive the gas to flow. In this case, the assembly composed of the centrifugal fan blade 100 and the driving component can be a water pump.

It should be noted that, in an embodiment, the centrifugal fan blades 100 can be configured to drive the fluid with a low temperature to move and exchange heat with the components to be heat exchanged with a higher temperature to dissipate heat. In an embodiment, the centrifugal fan blades 100 can also be provided to drive the fluid with a higher temperature to move and exchange heat with the components to be heat exchanged with a lower temperature to increase the temperature.

The centrifugal fan blade 100 includes a hub 10 and a plurality of blades 20. The hub 10 is a component of the centrifugal fan blade 100 configured to be connected to external driving components. It can be understood that the hub 10 has a virtual rotation axis. After the centrifugal fan blade 100 is connected to the external driving component, the hub 10 can be rotated along the virtual rotation axis under the driving action of the external driving component, thereby driving the plurality of blades 20 to rotate along the virtual rotation axis.

The plurality of blades 20 are provided at intervals along the periphery of the hub 10, which means that the plurality of blades 20 are connected to the hub 10, and the plurality of blades 20 are provided on the periphery of the hub 10 around the aforementioned rotation axis. The plurality of blades 20 are sequentially provided at intervals so that there is a gap between adjacent blades 20. During the operation of the centrifugal fan blade 100, fluid can flow into the gap between adjacent blades 20 through the end of the blade 20 close to the hub 10, and moves toward the end away from the hub 10 under centrifugal action.

The blade 20 includes a body part 21 and a bending part 22. The body part 21 is the main structural component of the blade 20 and plays a role in defining the overall structural shape of the blade 20. In an embodiment, the body part 21 may be provided with unequal thicknesses, that is, from the end of the body part 21 close to the hub 10 to the end away from the hub 10, the thickness of the body part 21 may gradually increase and/or gradually decrease, which is not limited in the present application.

In an embodiment of the present application, one end of the body part 21 is connected to the hub 10. An implementation may be that one end of the body part 21 and the hub 10 are detachably connected by threaded connection, snap connection, etc. to improve the efficiency of maintaining or replacing the centrifugal fan 100, and lower the maintenance cost of the centrifugal fan blade 100. In an embodiment, one end of the body part 21 and the hub 10 can also be fixedly or integrally connected to improve the structural consistency between the blade 20 and the hub 10, and improve the working stability of the centrifugal fan blade 100.

The bending part 22 is provided at an end of the body part 21 away from the hub 10. An implementation may be that the bending part 22 and the body part 21 are an integrally formed structure. In an embodiment, the bending part 22 and the body part 21 may also be connected in a detachable manner, which is not limited in the present application.

The orientation and the rotation direction of the bending part 22 are the same, which means that the direction in which the bending part 22 bends relative to the body part 21 is consistent with the direction in which the body part 21 rotates following the hub 10. That is, the bending part 22 is formed by bending on the windward side of the body part 21 when rotating.

An angle is formed between the bending part 22 and the body part 21. In this way, during the operation of the centrifugal fan blade 100, when the fluid introduced between the adjacent blades 20 flows to one end of the bending part 22 in a direction parallel to the body part 21 under centrifugal action, the fluid generates turbulent flow under the blocking effect of the bending part 22, and further forms an air cushion at the bending part 22. In this way, the air cushion can be configured to change the flow direction of the fluid, and generate a traction force for the fluid to continue to flow forward, which further accelerates the flow rate of the fluid, thereby increasing the flow rate when the fluid flows out of the centrifugal fan blade 100, and improving the heat exchange efficiency of the centrifugal fan blade 100.

In this regard, the improvement of heat exchange efficiency can be explained from the aspect of energy conservation. As shown in FIG. 2 and FIG. 5 specifically. According to the energy conservation law $A1V1=A2V2=$constant, where A1 is the fan distance between the blades G1 multiplied by the blade height; G1 is the distance of adjacent blades at the fluid outlet in the prior art; V1 is the velocity of fluid flowing out through the fluid outlet in the prior art; A2 is the fan distance between the blades G2 multiplied by the blade height; G2 is the distance between adjacent blades in the fan blade at the fluid outlet according to the present application; V2 is the velocity of the fluid flowing out through the fluid outlet in the centrifugal fan blade according to the present application. In an embodiment of the present application, by providing the aforementioned bending part 22 at one end of the body part 21 away from the hub 10, and forming an angle between the bending part 22 and the body part 21, the distance of the fluid flowing through the fluid outlet is reduced. On the premise that other parameters of the centrifugal fan blades are the same, since $G2<G1$, so $A2<A1$, therefore, $V2>V1$, that is, the centrifugal fan blades provided by the present application can improve the velocity of the fluid when it flows out, thereby increasing the flow rate of the fluid and improving the heat exchange efficiency of the centrifugal fan blades.

According to the centrifugal fan blade 100 provided in the embodiment of the present application, the blade 20 of the centrifugal fan blade 100 includes a body part 21 and a bending part 22. The bending part 22 is provided at an end of the body part 21 away from the hub 10. The orientation and the rotation direction of the bending part 22 are the same, and an angle is formed between the bending part 22 and the body part 21. During the operation of the centrifugal fan blade 100, the hub 10 rotates under the driving action of the external motor, thereby driving a plurality of blades 20 to rotate, so that the fluid is introduced from the intersection of the hub 10 and the blade 20, and is pushed out radially to the end of the blade away from the hub 10 under the action of centrifugal force. At the same time, since the bending part 22 is provided at the end of the body part 21 away from the hub 10, which forms an obstacle to the fluid to generate turbulence, and further becomes an air cushion, thereby changing the original flow path of the fluid, generating outward traction, increasing the fluid flow speed, thereby increasing the flow rate of the fluid when flowing out of the blade 20, and improving the heat exchange efficiency of the centrifugal fan blade 100.

According to an embodiment of the first aspect of the present application, the body part 21 includes a first surface 211 and a second surface 212. The first surface 211 and the second surface 212 are provided oppositely along the thickness direction; and the bending part 22 is protrudingly provided from the first surface 211.

The body part 21 includes a first surface 211 and a second surface 212. The first surface 211 and the second surface 212 are provided oppositely along the thickness direction, the first surface 211 is the windward surface of the body part 21 when rotating, and the second surface 212 is the leeward surface of the body part 21 when rotating.

The bending part 22 protrudingly provided from the first surface 211 means that the bending part 22 can be provided to protrude from the windward surface along the thickness direction of the body part 21. As such, in an embodiment of the present application, when the centrifugal fan blades 100 rotate, only one air cushion is formed between adjacent blades 20, which can better control the flow direction of the fluid and make the fluid flow out to the periphery more evenly, which is conducive to improving the stability of the centrifugal fan blade 100 during operation.

According to an embodiment of the first aspect of the present application, the minimum distance between the first surface 211 and the second surface 212 is t1, the distance of the bending part 22 protruding from the first surface 211 is t2, and $0.5t1 \leq t2 \leq 2.5t1$.

The minimum distance between the first surface 211 and the second surface 212 is t1, which refers to the minimum thickness dimension of the body part 21 is t1, and the dimension t2 of the bending part 22 protruding from the first surface 211 can be regarded as the blocking height of the bending part 22 in the fluid flow direction. In an embodiment of the present application, by providing $0.5t1 \leq t2 \leq 2.5t1$, a better fluid velocity increasing effect can be obtained. That is, when the value of t2 is less than 0.5t1, since the blocking height of the bending part 22 in the direction of fluid flow is too low, it is difficult to form an effective air cushion by blocking the fluid, or the formed air cushion has a weak re-accelerating effect on the fluid, so that the effect of increasing the fluid velocity is limited. When the value of t2 is greater than 2.5 times t1, the blocking height of the fluid by the bending part 22 will be too high, causing the outflow resistance of the fluid to be too large, and the fluid will be difficult to form an effective air cushion when generating the turbulent flow after being blocked.

For example, in an embodiment, t2=t1, or t2=1.5t1, or t2=2t1 may be set, but is not limited to.

According to an embodiment of the first aspect of the present application, the bending part 22 includes a third surface 221 and a fourth surface 222 provided oppositely, the third surface 221 is connected to the first surface 211, and the fourth surface 222 is connected to the second surface 212. The minimum distance between the first surface 211 and the second surface 212 is t1, the distance between the third surface 221 and the fourth surface 222 is t3, and $0.5t1 \leq t3 \leq 1.5t1$.

In an embodiment of the present application, the distance t3 between the third surface 221 and the fourth surface 222 can be regarded as the thickness of the bending part 22, and this numerical value determines the structural strength of the bending part 22. In an embodiment of the present application, by setting $0.5 \leq t1 \leq t3 \leq 1.5t1$, a better fluid velocity increasing effect can be obtained. That is, when the value of t3 is set to less than 0.5t1, that is, the size of the bending part 22 protruding from the first surface 211 is less than 0.5 times t1, resulting in a weak structural strength of the bending part 22 itself and prone to shrinkage and deformation during operation, and then it is difficult to form a stable air cushion, which affects the acceleration effect of the fluid; and when the value of t3 is set to be greater than 1.5 times t1, the blocking effect of the bending part 22 on the fluid is difficult to increase again, and the self-weight of the body part 21 will be increased. This further increases the load on the external driving components and increases the power consumption, which also affects the heat exchange efficiency.

For example, in an embodiment, t3=t1, or t3=0.75t1, or t3=1.25t1 may be set, but is not limited to.

According to an embodiment of the first aspect of the present application, a distance between the first surface 211 and the second surface 212 along the thickness direction is kept consistent at any position of the body part 21, which means that in an embodiment of the present application, the thickness of each position of the body part 21 is kept consistent to improve the uniformity of the structural strength at each position of the body part 21.

According to an embodiment of the first aspect of the present application, a rounded angle is provided between the third surface 221 and the first surface 211. In an embodiment, a rounded angle may also be provided between the fourth surface 222 and the second surface 212. In this way, the smoothness of the intersection between the third surface 221 and the first surface 211 and the intersection between the fourth surface 222 and the second surface 212 can be improved, thereby reducing the resistance of the fluid when passing through these locations to further improve the acceleration effect of the fluid in the centrifugal fan blade 100.

According to an embodiment of the first aspect of the present application, the body part 21 is in a curved plate structure, and the distance between adjacent body parts 21 at the end of the body part 21 close to the hub 10 is smaller than the distance between adjacent body parts 21 at the end of the body part 21 close to the hub 10.

The body part 21 is configured as a curved plate structure, which can be configured to balance the noise level generated by the centrifugal fan blade 100 and the fluid driving efficiency during operation. The bending form of the body part 21 can be selected according to the application scenario of the product, which is not limited in the present application.

For example, in an embodiment of the present application, it may be provided that the distance between adjacent body parts 21 gradually increases in the direction from one end of the body part 21 close to the hub 10 to the other end.

According to an embodiment of the first aspect of the present application, the plurality of blades are centrally symmetrical about the hub. In order to further improve the structural consistency of the centrifugal fan blade 100, the fluid can be ejected to the surroundings more uniformly, and the reliability is better.

Figure 8:
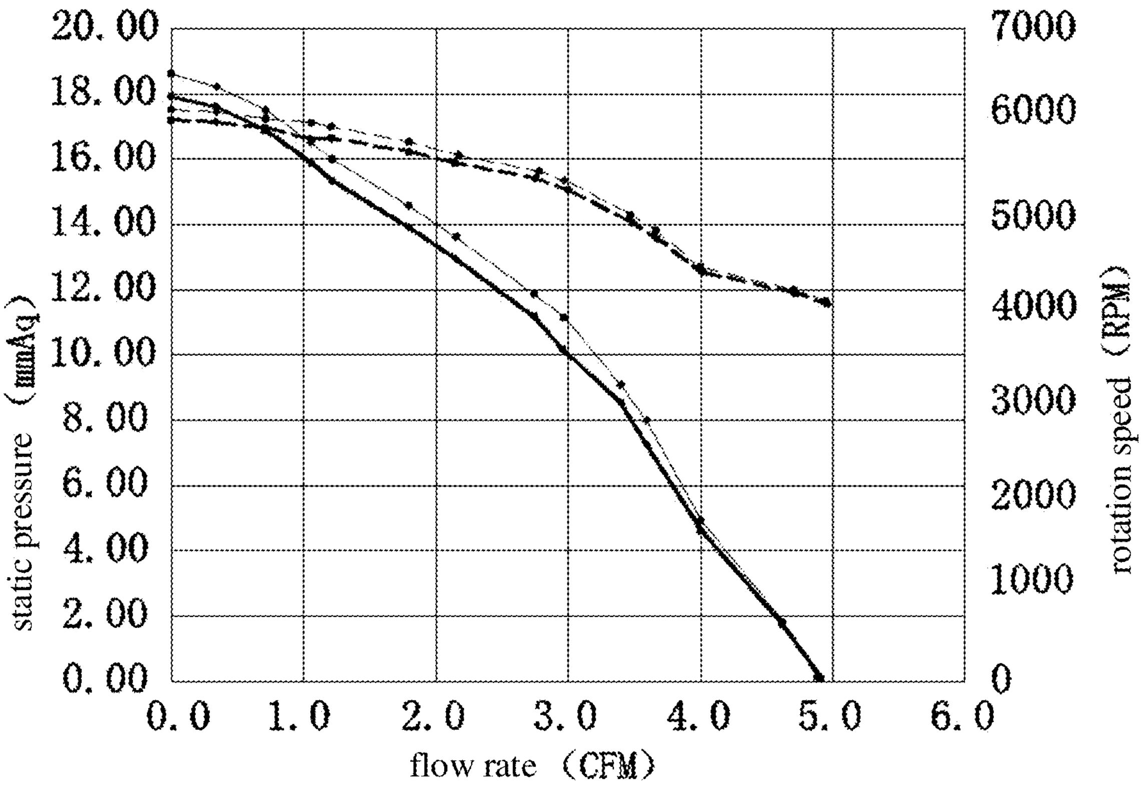
FIG. 8 is a comparison chart of actual measured data of static pressure, motor speed and fluid air volume of the centrifugal fan blade provided according to the first embodiment of the present application and the centrifugal fan blade of the prior art shown in FIG. 1.

FIG. 8 is a comparison chart of actual measured data of the fluid air pressure, motor speed and fluid air volume of the centrifugal fan blade provided according to the first embodiment of the present application and the centrifugal fan blade of the prior art shown in FIG. 1.

As shown in FIG. 8, which shows actual numerical test on the outlet flow rate, motor speed, and outlet flow rate and static pressure under the same external conditions for the centrifugal fan blade provided by the prior art shown in FIG. 1 and the centrifugal fan blade 100 provided by the present application.

The thin solid line represents the relationship between the flow rate and static pressure at the outlet of the centrifugal fan blade 100 provided in the embodiment of the present application. The thick solid line represents the relationship between the flow rate and static pressure at the outlet of the centrifugal fan blade provided by the prior art shown in FIG. 1. It can be seen from FIG. 8 that under the same static pressure, the centrifugal fan blade 100 provided by the embodiment of the present application can obtain a greater flow rate at the outlet.

The thin dotted line represents the relationship between the flow rate at the outlet of the centrifugal fan blade 100 provided by the embodiment of the present application and the rotation speed of the external motor. The thick dotted line represents the relationship between the flow rate at the outlet of the centrifugal fan blade 100 provided by the prior art and the rotation speed of the external motor. It can be seen from FIG. 8, under the condition of the same motor speed, the centrifugal fan blade 100 provided by the embodiment of the present application can obtain a greater flow rate at the outlet.

TABLE 1

| Type of centrifugal fan blade | Flow rate percentage at the fluid outlet 1 | Flow rate (CFM) at the fluid outlet 1 | Flow rate percentage at the fluid outlet 2 | Flow rate (CFM) at the fluid outlet 2 | Total fluid volume (CFM) |
|---|---|---|---|---|---|
| The present application | 44% | 6.44 | 56% | 8.34 | 14.78 |
| Prior art | 35% | 4.55 | 65% | 8.64 | 13.19 |

Table 1 records simulation rendering data of the centrifugal fan blade provided according to the first embodiment of the present application and the centrifugal fan blade of the prior art shown in FIG. 1. In this simulation, the parameters and motor speed of the centrifugal fan blade of the prior art are the same as the centrifugal fan blade 100 provided in the embodiment of the present application, and the air volume changes of the two air outlets are measured to determine the performance of the centrifugal fan blades.

It can be seen from the table 1 that under the premise that other parameters remain unchanged, the flow rate percentage of the centrifugal fan blade 100 provided by the embodiment of the present application at the fluid outlet 1 is 44%, and the flow rate is 6.44 CFM. The flow rate percentage at fluid outlet 2 is 56%, and the flow rate is 8.34 CFM. The flow rate percentage of the centrifugal fan blade of the prior art shown in FIG. 1 at fluid outlet 1 is 35%, the flow rate is 4.55 CFM. The flow rate percentage at fluid outlet 2 is 65%, and the flow rate is 8.64 CFM. Therefore, the total fluid volume (6.44 CFM+8.34 CFM) produced by the centrifugal fan blade 100 provided in the embodiment of the present application is higher than the total fluid volume produced by the two fluid outlets (4.55 CFM+8.64 CFM) in the prior art shown in FIG. 1, and the fluid distribution of the two fluid outlets is more even.

The present application further provides a fluid heat exchange device. The fluid heat exchange device includes a driving apparatus and a centrifugal fan blade 100 as provided in any embodiment of the first aspect. The specific structure of the centrifugal fan blade 100 refers to the above embodiment. Since the centrifugal fan blade 100 adopts all the technical solutions of all the above embodiments, and therefore has at least all the effects brought by the technical solutions of the above embodiments, which will not be repeated herein.

The above are only some embodiments of the present application, and are not intended to limit the scope of the present application. Any equivalent structural or process transformations made according to the description and drawings of the present application, or direct/indirect application in other related technical fields are included in the scope of the present application.

What is claimed is:

1. A centrifugal fan blade, comprising:

a hub; and a plurality of blades provided at intervals along a periphery of the hub;

wherein the plurality of blades comprise a body part and a bending part;

one end of the body part is connected to the hub, and the bending part is provided at an end of the body part away from the hub;

an orientation and a rotation direction of the bending part are the same, and an angle is formed between the bending part and the body part;

the body part comprises a first surface and a second surface provided oppositely along a thickness direction;

the bending part is protrudingly provided from the first surface;

a minimum distance between the first surface and the second surface is t1, and a distance of the bending part protruding from the first surface is t2; and t2 is greater than or equal to 0.5t1, and t2 is less than or equal to 2.5t1.

2. The centrifugal fan blade according to claim 1, wherein the bending part comprises a third surface and a fourth surface provided oppositely; the third surface is connected to the first surface, and the fourth surface is connected to the second surface; and a minimum distance between the first surface and the second surface is t1, and a distance between the third surface and the fourth surface is t3; t3 is greater than or equal to 0.5t1, and t3 is less than or equal to 1.5t1.

3. The centrifugal fan blade according to claim 2, wherein a distance between the first surface and the second surface along the thickness direction is kept consistent at any position of the body part.

4. The centrifugal fan blade according to claim 2, wherein a rounded angle is provided between the third surface and the first surface.

5. The centrifugal fan blade according to claim 4, wherein the plurality of blades are centrally symmetrical about the hub.

6. The centrifugal fan blade according to claim 2, wherein a rounded angle is provided between the fourth surface and the second surface.

7. The centrifugal fan blade according to claim 6, wherein the plurality of blades are centrally symmetrical about the hub.

8. The centrifugal fan blade according to claim 2, wherein the plurality of blades are centrally symmetrical about the hub.

9. The centrifugal fan blade according to claim 1, wherein a distance between the first surface and the second surface along the thickness direction is kept consistent at any position of the body part.

10. The centrifugal fan blade according to claim 9, wherein the plurality of blades are centrally symmetrical about the hub.

11. The centrifugal fan blade according to claim 1, wherein the body part is in a curved plate structure, and a distance between adjacent body parts at an end of the body part close to the hub is smaller than a distance between adjacent body parts at an end of the body part away from the hub.

12. The centrifugal fan blade according to claim 11, wherein the plurality of blades are centrally symmetrical about the hub.

13. The centrifugal fan blade according to claim 1, wherein the plurality of blades are centrally symmetrical about the hub.

14. A fluid heat exchange device, comprising the centrifugal fan blade according to claim 1.

15. The centrifugal fan blade according to claim 1, wherein a distance between the first surface and the second surface along the thickness direction is kept consistent at any position of the body part.

16. The centrifugal fan blade according to claim 1, wherein a distance between the first surface and the second surface along the thickness direction is kept consistent at any position of the body part.

17. The centrifugal fan blade according to claim 1, wherein the plurality of blades are centrally symmetrical about the hub.

18. The centrifugal fan blade according to claim 1, wherein the plurality of blades are centrally symmetrical about the hub.

* * * * *